United States Patent
Neelakanteshwar et al.

(10) Patent No.: US 12,375,553 B1
(45) Date of Patent: Jul. 29, 2025

(54) DISTRIBUTING TRANSACTION PROCESSING BASED ON PROCESSOR CAPACITY AND CONFIGURATION

(71) Applicant: Amazon Technologies, Inc., Seattle, WA (US)

(72) Inventors: Manohari Neelakanteshwar, Bangalore (IN); Mohit Gupta, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 18/122,508

(22) Filed: Mar. 16, 2023

(51) Int. Cl.
| | |
|---|---|
| *H04L 67/1008* | (2022.01) |
| *G06Q 20/10* | (2012.01) |
| *G06Q 20/40* | (2012.01) |
| *H04L 41/08* | (2022.01) |
| *H04L 41/16* | (2022.01) |

(52) U.S. Cl.
CPC .......... *H04L 67/1008* (2013.01); *H04L 41/08* (2013.01); *H04L 41/16* (2013.01); *G06Q 20/108* (2013.01); *G06Q 20/401* (2013.01)

(58) Field of Classification Search
CPC ...... H04L 67/1008; H04L 41/08; H04L 41/16
See application file for complete search history.

(56) References Cited

U.S. PATENT DOCUMENTS

| | | | |
|---|---|---|---|
| 9,229,670 B1 * | 1/2016 | Liebelt | G06F 3/1288 |
| 2008/0159141 A1 * | 7/2008 | Soukup | H04L 67/1001 |
| | | | 370/235 |
| 2015/0341407 A1 * | 11/2015 | Agnoli | H04L 67/565 |
| | | | 709/219 |
| 2024/0114078 A1 * | 4/2024 | Wei | H04L 67/131 |

* cited by examiner

*Primary Examiner* — Brian Whipple
(74) *Attorney, Agent, or Firm* — Kilpatrick Townsend & Stockton LLP

(57) ABSTRACT

Techniques for distributing transaction processing based on processor capacity and configuration are described herein. For example, a computer system can determine a trigger event indicating that transactions are no longer to be processed by a first processor. The computer system can select a second processor to which the transactions are to be sent. The second processor can be selected based on a transaction processing capacity of the second processor and a configuration of the second processor that indicates that the second processor is configured to process the transactions. The computer system can receive transaction data indicating that a transaction is to be processed. The transaction can be associated with transaction attributes. The computing system can send the transaction data to the second processor in real-time relative to the transaction data being received based at least in part on the second processor being selected and the transaction attributes.

20 Claims, 11 Drawing Sheets

DISTRIBUTING TRANSACTION PROCESSING BASED ON PROCESSOR CAPACITY AND CONFIGURATION

BACKGROUND

Transactions can be performed through online systems with various processing components. Some processing components may only be capable of performing a portion of the operations associated with a transaction or may periodically experience outages. As such, it may be difficult to complete a transaction in real time when, for example, a processing component is overloaded or is experiencing an outage.

BRIEF DESCRIPTION OF THE DRAWINGS

Various embodiments in accordance with the present disclosure will be described with reference to the drawings, in which.

DETAILED DESCRIPTION

Figure 1:
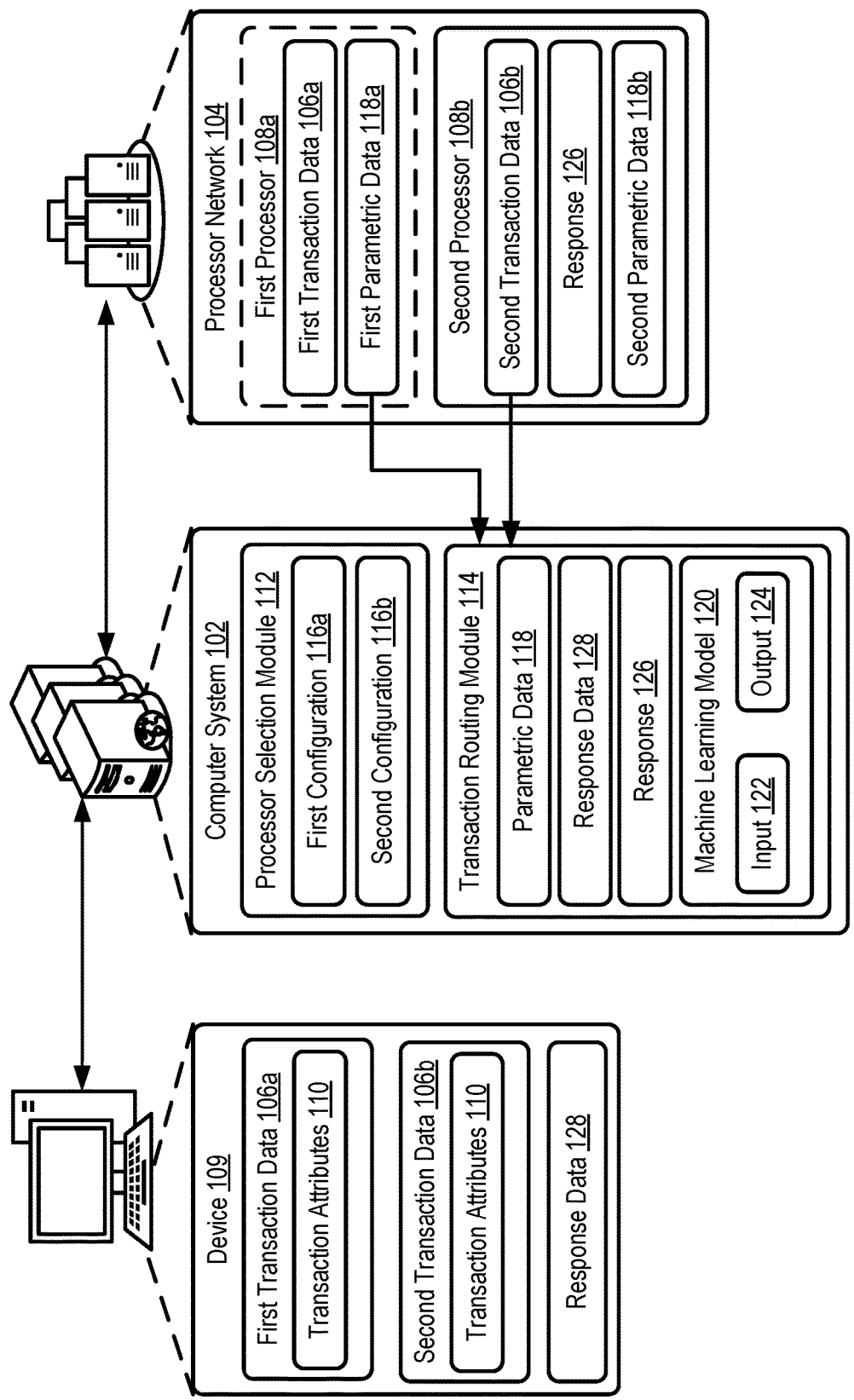
FIG. 1 illustrates an example of a computer system that distributes transactions to processors, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, dynamically distributing transactions for processing to processors based on processor capacity and configurations. In an example, a computer system can receive, from a device, first transaction data indicating that a first transaction is to be processed. The first transaction data can be associated with transaction attributes. The computer system can select a first processor from a plurality of processors based at least in part on a first configuration of the first processor indicating that the first processor is configured to process transactions associated with the transaction attributes. The computer system can send, to the first processor, the first transaction data. The computer system can determine a trigger event indicating that the transactions are no longer to be processed by the first processor. The computer system can select, from the plurality of processors, a second processor to which the transactions are to be sent. The second processor can be selected based at least in part on a transaction processing capacity of the second processor and a second configuration of the second processor. The computer system can receive, from the device, second transaction data indicating that a second transaction is to be processed. The second transaction can be associated with the transaction attributes. The computer system can send the second transaction data to the second processor in real-time relative to the second transaction data being received. The computer system can send the second transaction data based at least in part on the second processor being selected and the transaction attributes. The computer system can receive, from the second processor, a response associated with processing the second transaction. The computer system can send, to the device in real-time relative to the response being received, response data indicating the response.

To illustrate, consider a service that handles online transactions. The service can forward online transactions initiated by users to a computer system that can dynamically route the online transactions to various transaction processors within a network of processors. The transaction processors can process the online transactions. Typically, all online transactions received from the service can be routed to a particular transaction processor. However, the particular transaction processor may experience a trigger event that can hinder or prevent the particular transaction processor from processing the online transactions. For example, the particular transaction processor may experience an outage. In other examples, the particular transaction processor may have a capacity that exceeds a certain threshold (e.g., exceeding 90% capacity) or a latency that exceeds a certain threshold. In any case, the particular transaction processor may be unable to process the online transactions. Or, the particular transaction processor may be able to process the online transactions, but may not be able to process the online transactions in real time.

Before the computer system sends the online transactions to the particular transaction processor, the computer system can detect that the particular transaction processor has experienced the trigger event. The computer system can then select an alternate transaction processor in the processor network that can process the online transactions. For example, the computer system can determine that the alternate transaction processor is configured to handle online transactions from the service, has not reached a transaction processing capacity threshold, and can process online transactions with relatively low latency and in real time. Then, the computer system can route the online transactions to the alternate transaction processor. The computer system can continue to monitor both the particular transaction processor and the alternate transaction processor over time and adjust online transaction routing based on the monitoring. For example, while the particular transaction processor is experiencing the outage, the computer system can implement a phased approach to incrementally route online transactions to the alternate transaction processor until the alternate transaction processor reaches its transaction processing capacity threshold. At that point, the computer system can select another transaction processor to route the online transactions. Additionally, or alternatively, the computer system can apply a set of mitigation criteria to determine a subset of online transactions (e.g., ones with relatively a lower priority) and queue or drop this subset until the particular transaction processor or alternate transaction processor can process online transactions again.

Embodiments of the present disclosure provide various technological advantages over conventional techniques for routing and processing transactions due to a trigger event. For example, this process may be performed automatically from end-to-end, without a need for an operator to manually determine an alternate processor and route transactions to the alternate processor. This can greatly reduce impact of trigger events such as outages. The alternate processor may be selected in real-time (e.g., as soon as the trigger event is detected and/or confirmed over a period of time, where real-time accounts for any network and/or processing latency). And, as a result of automatically switching processors, transactions can continue to be processed in near real-time (e.g., within a few milliseconds, a few seconds, or a few minutes relative to processing latency). This can avoid the failed transactions that would typically result due to occurrence of the trigger event. The service providing the transactions may experience the same or similar processing of transactions, even when a trigger event has occurred. Additionally, transition between the failed processor and the alternate processor may be intelligently selected based on attributes of the transactions and parametric data of the processors. As such, high-priority transactions can be prioritized. And, adjusting transaction amounts routed to the alternate processor based on parametric data can prevent outages or other trigger events occurring in relation to the alternate processor. This can result in minimized latency for the system, as well as increased robustness and resilience of the system. In other words, the embodiments improve the distribution of processing within a network of processing components. The distribution mitigates a trigger event (e.g., an outage) impacting at least one of the processing components and prevents this trigger event to spread to other processing components (e.g., by re-allocating the processing to an alternate processor based on its capacity, improperly causing an outage of the alternate processor is mitigated). The distribution also enables to continue processing at least certain transactions (e.g., the ones having a relative high priority) in real-time.

In the interest of clarity of explanation, embodiments of the trigger event may be described herein as an outage of a processor. However, the embodiments are not limited as such. Instead, the embodiments of the trigger event may similarly apply to any event that can limit processing capabilities for the processor. For example, the embodiments may apply similarly to events such as high processing latency, high processing capacity, etc.

FIG. 1 illustrates an example of a computer system 102 that distributes transaction data 106*a-b* to processors 108*a-b*, according to embodiments of the present disclosure. As illustrated in FIG. 1, a device 109 can transmit transaction data 106*a-b* to the computer system 102, which can be a computer system associated with an entity. Transactions associated with the transaction data 106*a-b* can be initiated by at the device 109 or at other devices in communication with the device 109. The transaction data 106*a-b* can transaction attributes 110 that include information about the transactions, such as a transaction method identifier, a transaction amount, and a transaction type. The device 109 can be associated with a processor network 104, such as a healthcare provider, an insurance company processor, or a marketplace payment processor. The processor network 104 can include multiple processors 108*a-b*. Each processor 108 can be a service that is called to act on a transaction such that a function is performed using the transaction data 106 for the transaction. The computer system 102 can select one of the processors 108*a-b* to process transaction data 106*a-b*. The device 109 can be associated with various locations, such as a brick and mortar store or through an online system that offers items or services for purchase. The transaction can be performed using a transaction method that can be processed online over a network. For example, one of the processors 108*a-b* can process transaction data 106 using the transaction method to perform the transaction with a healthcare account, an insurance account, a credit card, cryptocurrency, rewards points, gift cards, and the like.

In an example, the device 109 can transmit the first transaction data 106*a* to the computer system 102. The computer system 102 can include a processor selection module 112 and a transaction routing module 114. The processor selection module 112 can store configurations 116*a-b* of the processors 108*a-b* that indicate which transactions the processors 108*a-b* can process. The processor selection module 112 can compare the transaction attributes 110 of the first transaction data 106*a* to the first configuration 116*a* of the first processor 108*a*. If the first configuration 116*a* indicates that the first processor 108*a* can process the transaction attributes 110 of the first transaction data 106*a*, the processor selection module 112 can select the first processor 108*a*. Then, the transaction routing module 114 can forward the first transaction data 106*a* to the first processor 108*a* based on that selection.

The transaction routing module 114 can also determine if the first processor 108*a* is experiencing an outage. For example, the device 109 may transmit second transaction data 106*b* to the computer system 102. The second transaction data 106*b* can include the same transaction attributes 110 as the first transaction data 106*a*. Thus, processor selection module 112 may select the first processor 108*a* to process the second transaction data 106*b*. But, before the transaction routing module 114 transmits the second transaction data 106*b* to the first processor 108*a*, the transaction routing module 114 can determine whether the first processor 108*a* is online or offline. If the first processor 108*a* is online, the second transaction data 106*b* can be transmitted to the first processor 108*a*. If the first processor 108*a* is offline, the second transaction data 106*b* can be transmitted to another processor in the processor network 104. In this way, services that are unavailable from the first processor 108*a* can be extended to another processor in the processor network 104 with minimal impact to the user of the device 109.

To determine whether the first processor 108*a* is online or offline, the transaction routing module 114 can store parametric data 118 that indicates whether the processors 108*a-b* are experiencing outages. For example, the transaction routing module 114 can receive first parametric data 118*a* from the first processor 108*a* that indicates that the first processor 108*a* has experienced an outage and cannot process the second transaction data 106*b*. The parametric data 118 can also include further information about the processors 108*a-b*, including the health of each processor 108*a-b*, the processing latency, the transaction processing capacity, etc. In some examples, the transaction routing module 114 can use the parametric data 118 to determine that the first processor 108a should not process the second transaction data 106b even if the first processor 108a is not experiencing an outage. For example, the first parametric data 118a may indicate that the first processor 108a is processing transaction data 106 too slowly (e.g., processing latency is above a predefined threshold) or may exceed a predefined transaction processing capacity that may cause high latency.

In some examples, the transaction routing module 114 may determine that the first processor 108a has experienced an outage by monitoring the first parametric data 118a over time. For example, the first parametric data 118a at a first time may indicate that the first processor 108a is no longer outputting signals. During and/or after a predetermined amount of time (e.g., fifteen minutes) has passed, the transaction routing module 114 can monitor additional first parametric data 118a for the first processor 108a. If the first parametric data 118a indicates that the first processor 108a has restarted typical functions, the transaction routing module 114 may determine that the first processor 108a has not experienced an outage. Therefore, the first processor 108a can process the second transaction data 106b. If the first parametric data 118a indicates that the first processor 108a is still not outputting signals, the transaction routing module 114 may determine that the first processor 108a has experienced an outage.

Additionally or alternatively, the transaction routing module 114 can determine whether the first processor 108a is online using a machine learning model 120. The machine learning model 120 may be trained with parametric training data to output indications of the health of processors. The transaction routing module 114 can generate an input 122 to the machine learning model 120 based at least in part on the first parametric data 118a for the first processor 108a. The transaction routing module 114 can provide the input 122 to the machine learning model 120. In response, the machine learning model 120 can generate an output 124 based at least in part on the input 122. The transaction routing module 114 can use the output 124 to monitor the first processor 108a. For example, the output 124 may indicate that the first processor 108a is experiencing an outage. The transaction routing module 114 can therefore determine that the first processor 108a will not process the second transaction data 106b due to the outage.

Upon determining that the first processor 108a will not process the second transaction data 106b, the processor selection module 112 can select another processor 108 in the processor network 104. The processor selection module 112 can compare the transaction attributes 110 of the second transaction data 106b to the second configuration 116b of the second processor 108b to determine if the second processor 108b can process the second transaction data 106b. For example, the processor selection module 112 may determine that the second processor 108b can process transaction data for transactions performed with certain transaction methods, made from certain merchant locations, for certain products or services, from certain locations, etc. This can include the second transaction data 106b, so the processor selection module 112 can select the second processor 108b.

In response, the transaction routing module 114 can examine second parametric data 118b received from the second processor 108b. In some examples, the transaction routing module 114 can generate another input 122 for the machine learning model 120 based on the second parametric data 118b. If the second parametric data 118b (or the resulting output 124 from the machine learning model 120) indicates that the second processor 108b is not experiencing an outage (and, in some examples, is capable of processing the second transaction data 106b in real time), the transaction routing module 114 can transmit the second transaction data 106b to the second processor 108b. The second processor 108b can then process the second transaction data 106b to complete the transaction in real time. After processing the second transaction data 106b, the second processor 108b can generate a response 126 associated with processing the second transaction data 106b. The second processor 108b can transmit the response 126 to the transaction routing module 114. The transaction routing module 114 can then generate response data 128 based on the response 126 to send to the device 109. The response data 128 can indicate that the second transaction data 106b has been successfully processed, and that the associated transaction has been performed.

In some examples, the second processor 108b may not have the same transaction processing capacity as the first processor 108a. For example, the second processor 108b may have a smaller transaction processing capacity than the first processor 108a. Therefore, the second processor 108b may be unable to process all redirected transaction data 106 from the first processor 108a, as doing so may trigger an outage of the second processor 108b. To prevent this additional outage, the transaction routing module 114 can continuously receive and monitor the parametric data 118 for the processors 108a-b as part of a feedback loop. Based on the parametric data 118 received after distributing a workload to the second processor 108b, the transaction routing module 114 can determine that only a subset of transaction data received during the outage should be sent to the second processor 108b, rather than all of the transaction data 106. After the subset of transaction data is transmitted to the second processor 108b, the resulting parametric data can then indicate that the second processor 108b has an unused processing capacity that can handle the entire set of transaction data. Thus, the amount of transactions sent to the second processor 108b can be dynamically adjusted over time based on the persistence of the outage and the parametric data for the second processor 108b.

In some examples, the second parametric data 118b received for the second processor 108b as part of the feedback loop can be used by the transaction routing module 114b to generate an input 122 to the machine learning model 120. The machine learning model 120 can generate an output 124 that can indicate anomalies or potential trigger events for the second processor 108b. For example, the transaction routing module 114 may determine that the output 124 indicates that the current number of transactions being transmitted to the second processor 108b may soon trigger an outage. Thus, the transaction routing module 114 can reduce the number of transactions being transmitted to the second processor 108b, and can continue to monitor the second parametric data 118b to determine if outage risk has been reduced. The transaction routing module 114 can simultaneously monitor the first parametric data 118a for the first processor 108a to determine if the outage of the first processor 108a persists.

In some examples, the computer system 102 can perform a mock outage in which the transactions are simulated to measure performance of the processors 108a-b in the processor network 104. For example, the computer system 102 can perform the mock outage to determine the impact on the second processor 108b due to an outage of the first processor 108a when 60,000 transactions are being received per second. The transactions can be actual transactions received from the device 109. Alternatively, the transactions can be simulated. For example, the simulated transactions can be generated for use in the mock outage. In another example, the simulated transactions can be a copy of transactions that were previously received from the device 109 and processed.

Figure 2:
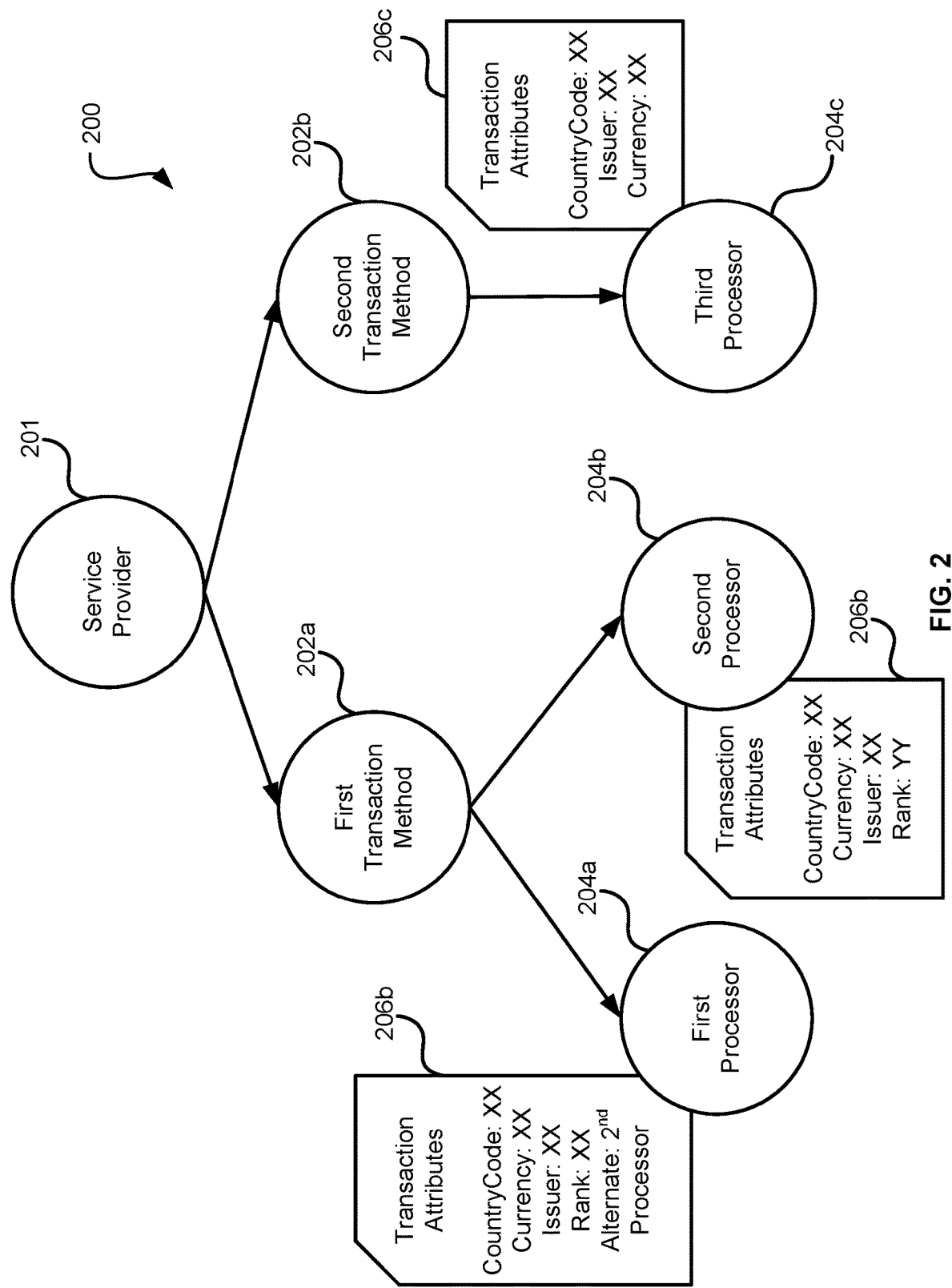
FIG. 2 illustrates a sequence diagram for distributing transactions to processors, according to embodiments of the present disclosure.

FIG. 2 illustrates a sequence diagram 200 for distributing transactions to processors 204, according to embodiments of the present disclosure. In an example, the sequence diagram 200 can start with a service provider 201 that handles transactions. Users can interact with the service provider 201 to initiate the transactions. The transactions can be performed using different transaction methods 202a-b. For example, first transaction method 202a may use credit cards to perform transactions. Second transaction method 202b may use debit cards to perform transactions. The transaction methods 202a-b may each have one or more associated processors 204a-c that can process the transactions using the transaction methods 202a-b. Each processor 204a-c may have configurations 206a-c that can process transactions that have certain transaction attributes. For example, each of the configurations 206a-c can specify a country code, a type of currency, and an issuer of transactions that the associated processors 204a-c can process. The first configuration 206a and second configuration 206b may also specify a rank (e.g., a priority) of the first processor 204a and second processor 204b. The rank for the second processor 204b can be lower than the rank for the first processor 204a. The rank can indicate that transactions that can be processed by the first processor 204a or the second processor 204b are prioritized to be processed by the first processor 204a. Additionally, the first configuration 206a can include a designation of an alternate processor, such as the second processor 204b. This can indicate that the second processor 204b can be used as a backup if the first processor 204a cannot process transactions. Such an example is depicted in FIG. 3.

Figure 3:
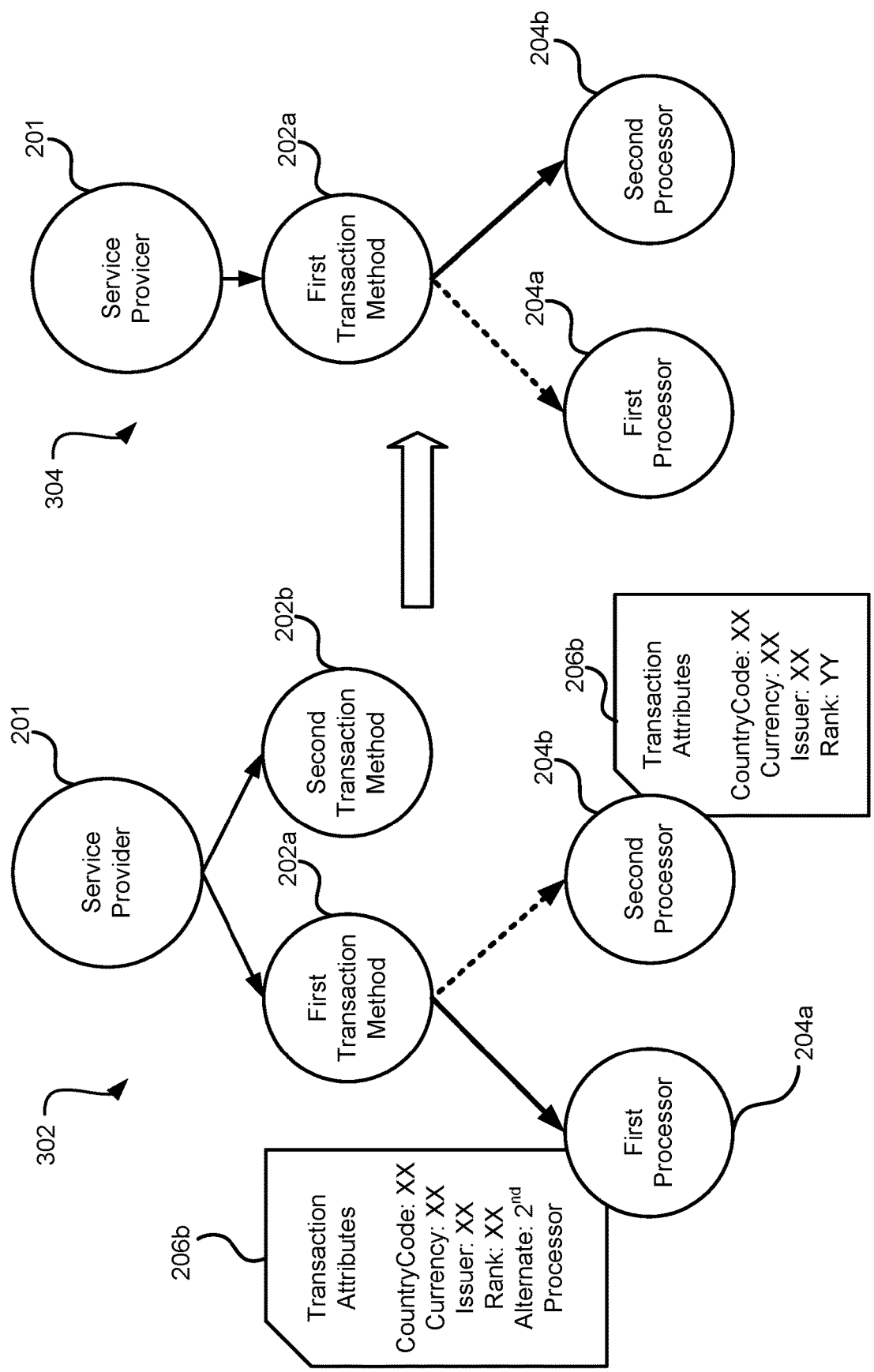
FIG. 3 illustrates another sequence diagram for distributing transactions to processors, according to embodiments of the present disclosure.

FIG. 3 illustrates another sequence diagram for distributing transactions to processors 204a-b, according to embodiments of the present disclosure. At a first time 302, the service provider 201 can be prompted by a user to perform a transaction. The service provider can select one of the transaction methods 202a-b for the transaction. The transaction method 202 can be specified by the user. In this example, the first transaction method 202a can be specified. The transaction can be processed using the first transaction method 202a by either a first processor 204a or a second processor 204b, each of which have configurations 206b that specify transaction attributes of transactions that can be processed by the processors 204. Because the first configuration 206a of the first processor 204a has a higher rank than the rank specified in the second configuration 206b of the second processor 204b, the transaction can be processed by the first processor 204a. The second processor 204b can remain unused for the purpose of this transaction.

At a second time 304, the service provider 201 can receive a second transaction that specifies the first transaction method 202a. But the first processor 204a may be unable to process the second transaction. For example, the first processor 204a may be experiencing an outage. To maintain a low latency of the system, and to allow the transaction to be processed in real time, the transaction can be routed to the second processor 204b instead for processing. The second processor 204b can be selected because the second configuration 206b can indicate that the second processor 204b can process transactions with certain transaction attributes. For example, the second transaction may have a country code, a currency, and an issuer that can be processed by the second processor 204b. Additionally, the first configuration 206a may specify that the second processor 204b is an alternate processor for the first processor 204a. Thus, the second transaction can be sent to the second processor 204b.

In some examples, transactions may be routed to an alternate processor in phases based on a transaction processing capacity of the alternate processor. If the alternate processor has a transaction processing capacity that can handle all of the transaction traffic that was intended for the first processor, then all transactions received during the outage can be routed to the alternate processor. In other examples, the alternate processor may have a lower transaction processing capacity than the first processor and may therefore be unable to process all re-routed transactions. Thus, transactions may be re-routed to the alternate processor in stages.

Figure 4:
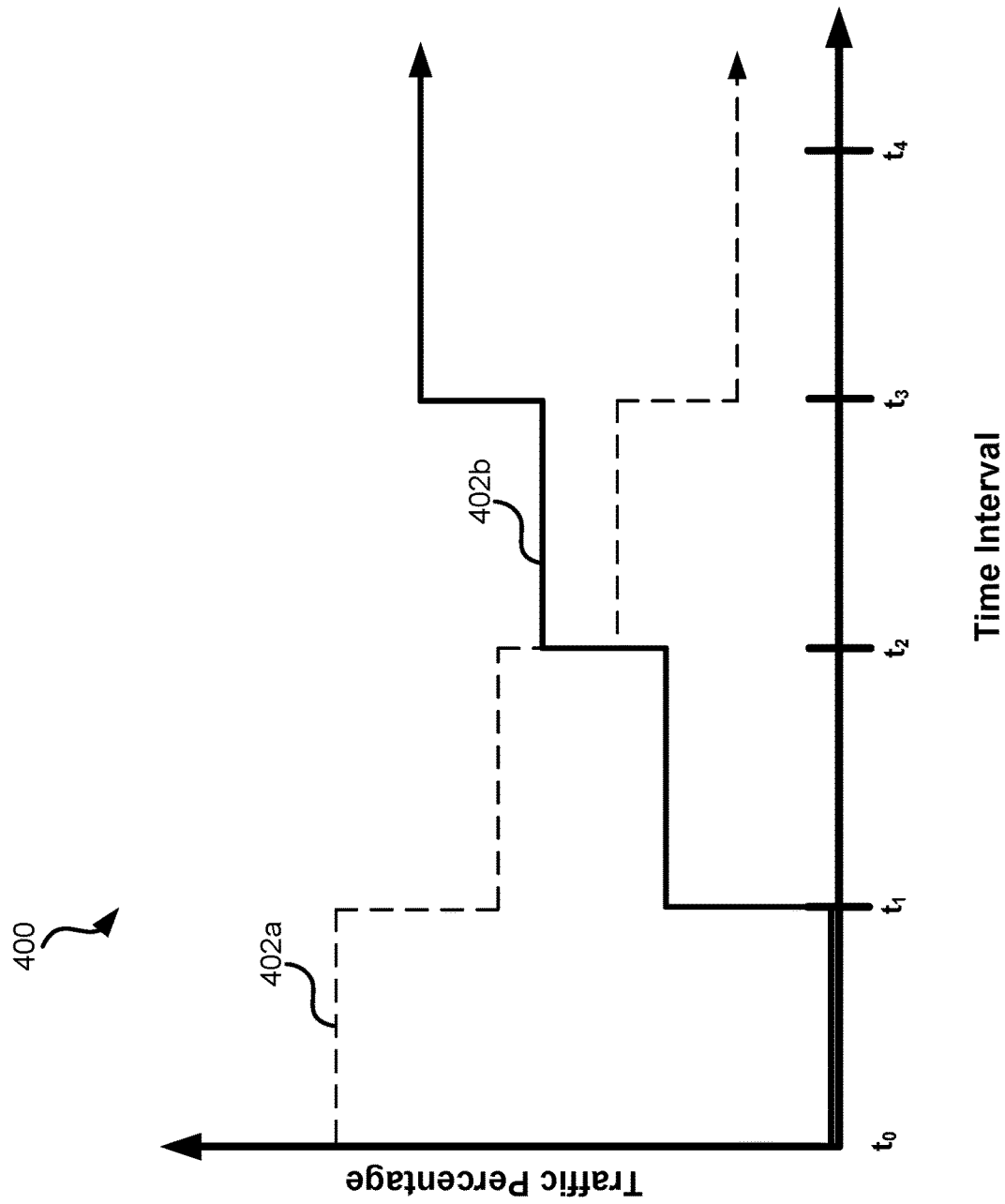
FIG. 4 illustrates a graph depicting traffic percentages for two processors, according to embodiments of the present disclosure.

For example, FIG. 4 illustrates a graph 400 depicting traffic percentages 402a-b for two processors, according to embodiments of the present disclosure. The graph 400 depicts a first traffic percentage 402a to a first processor and a second traffic percentage 404b to a second processor over time intervals $t_0$-$t_4$.

At $t_0$, most or all of the traffic (e.g., transactions) may be routed to the first processor, with very little or no traffic (e.g., additional traffic that would have the same attributes as the traffic) being routed to the second processor. After to, an outage of the first processor may be detected. But the second processor may already be processing transactions (e.g., having different attributes) and may be unable to receive and process all of the traffic intended for the first processor. This can be determined by the computer system 102 of FIG. 1 based on parametric data for the first processor and second processor. So, the computer system 102 may determine an increase in traffic to be routed to the second processor at time $t_1$, with a corresponding decrease in traffic routed to the first processor. The computer system 102 can then continue to scale up traffic for the second processor and scale down traffic for the first processor over the subsequent time intervals. Scaling up traffic over time can ensure that the second processor is not overloaded. This can prevent an outage of the second processor and maintain a low latency and real-time processing of transactions. At each time interval, the computer system 102 can identify if the outage of the first processor is persisting. If the outage persists, the computer system 102 can determine if the second processor can process additional traffic (e.g., based on its parametric data indicating that its capacity has not been reached, its processing latency is still smaller than a threshold amount, etc.). If so, the computer system 102 can continue to shift the traffic to the second processor. Otherwise, transactions routed to the first processor during the outage can be queued to be processed by the first processor after the outage is over, timed out, declined, failed, or queued to be processed by the second processor during a subsequent time interval. When the first processor is back online after the outage, in some examples traffic can be scaled up for the first processor and scaled down for the second processor in stages in a similar manner.

In some examples, some traffic may be routed to the second processor based on a set of mitigation criteria. If a transaction meets the set of mitigation criteria, the transaction may be routed to the second processor rather than being queued or declined. The set of mitigation criteria can include a priority (time-based, security-based, service level agreement-based, etc.) for transactions that need to be processed relatively quickly. For example, time-critical transactions or secure transactions such as transactions that required authorization before initiation may be specified by the set of mitigation criteria. Less time-critical or less secure transactions, such as refunds, may not be specified by the set of mitigation criteria. Additional examples of the set of mitigation criteria can include a transaction type priority (e.g., prioritizing particular transaction methods) or an account priority associated with an account used by a device to send the transaction data. For example, a transaction may be sent from an account that is designated as a high priority account that initiates a relatively high volume of transactions.

Figure 5:
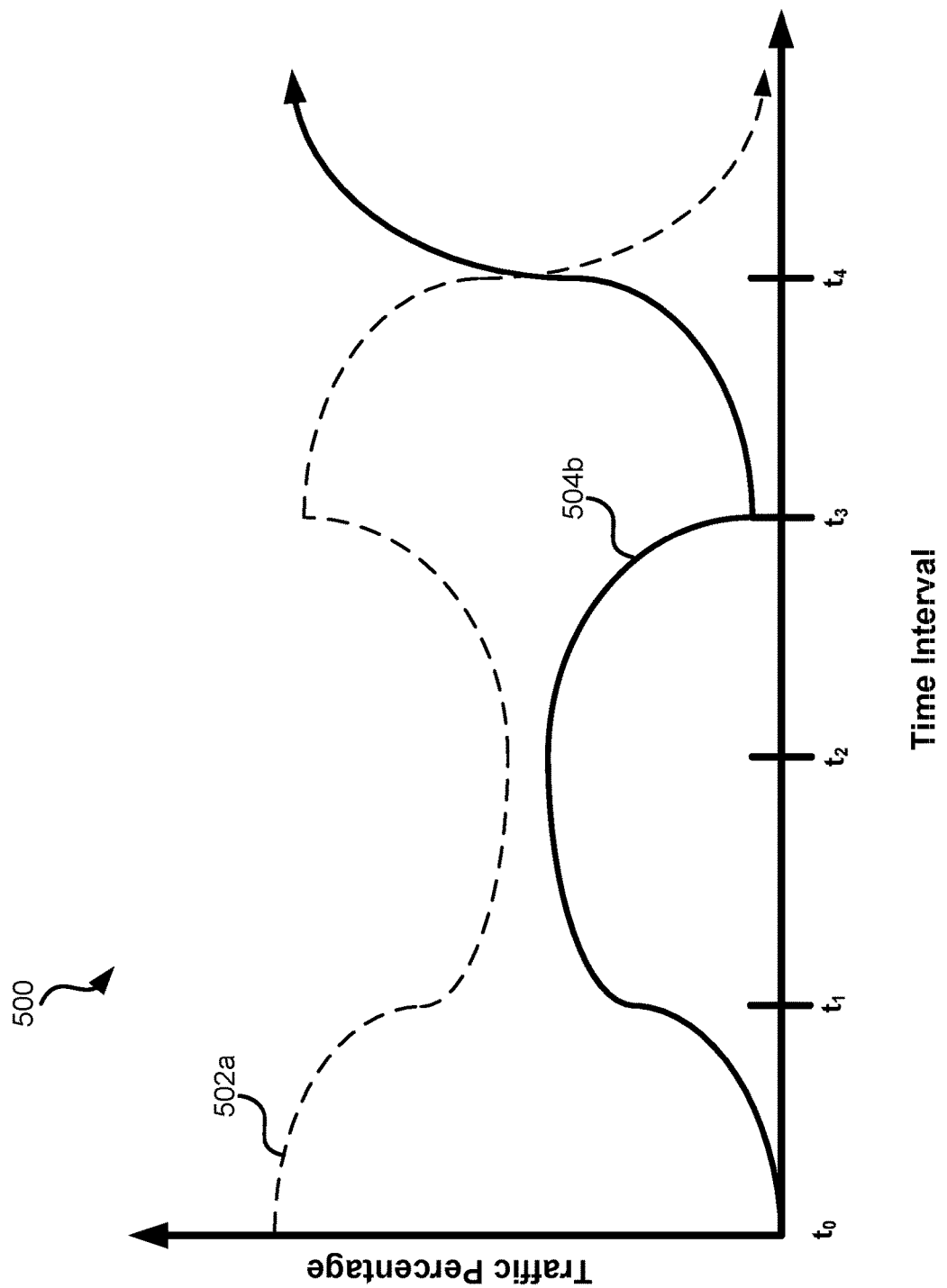
FIG. 5 illustrates another graph depicting traffic percentages for two processors, according to embodiments of the present disclosure.

While the traffic percentages 402a-b depicted in FIG. 4 increase or decrease in phases at predefined time intervals and/or number of transactions (e.g., percentage of traffic), in other examples the traffic may be routed more dynamically. For example, FIG. 5 illustrates another graph depicting traffic percentages for two processors, according to embodiments of the present disclosure. The graph 500 depicts a first traffic percentage 502a to a first processor and a second traffic percentage 504b to a second processor over time intervals $t_0$-$t_4$.

At $t_0$, most or all of the traffic (e.g., transactions) may be routed to the first processor, with very little or no traffic being routed to the second processor. After to, the computer system 102 of FIG. 1 can determine (based on parametric data for the first processor), that the first processor is experiencing a processing latency that exceeds a predefined threshold. To prevent an outage, the computer system 102 may select the second processor as an alternate processor to process transactions that would typically be processed by the first processor. Between $t_0$ and $t_1$, the computer system 102 can decrease traffic to the first processor and increase traffic to the second processor. At $t_1$, the computer system 102 can use parametric data for the first processor to determine that processing latency for the first processor is almost below the predefined threshold. So, the computer system 102 can continue to decrease traffic to the first processor and increase traffic to the second processor between $t_1$ and $t_2$, but at a slower rate than between to and $t_1$.

At $t_2$, the computer system 102 can detect use parametric data for the first processor to determine that processing latency for the first processor has significantly decreased. In fact, the second processor may no longer be needed to handle transactions for the first processor. Thus, between $t_2$ and $t_3$, the computer system 102 can increase most or all traffic back to the first processor and decrease some or all traffic to the second processor. At $t_3$, the computer system 102 can determine that the first processor has experienced an outage, and all traffic may need to be routed to the second processor. The computer system 102 may determine that shifting all traffic to the second processor may overload the second processor and trigger an outage. To prevent an outage of the second processor, the computer system 102 can decrease some traffic to the first processor and increase some traffic to the second processor between $t_3$ and $t_4$. At $t_4$, the computer system 102 can determine that the outage of the first processor persists and can continue to decrease traffic to the first processor and increase traffic to the second processor.

Flows are described in connection with the next figures. Operations of the example flows can be implemented by a system (which may include any of the devices described herein above and/or any remote computer system described herein above). Instructions for performing the operations can be stored as computer-readable instructions on a non-transitory computer-readable medium of the system. As stored, the instructions represent programmable modules that include code executable by a processor(s) of the system. The execution of such instructions configures the system to perform the specific operations shown in the figures and described herein. Each programmable module in combination with the processor represents a means for performing a respective operation(s). While the operations are illustrated in a particular order, it should be understood that no particular order is required.

Figure 6:
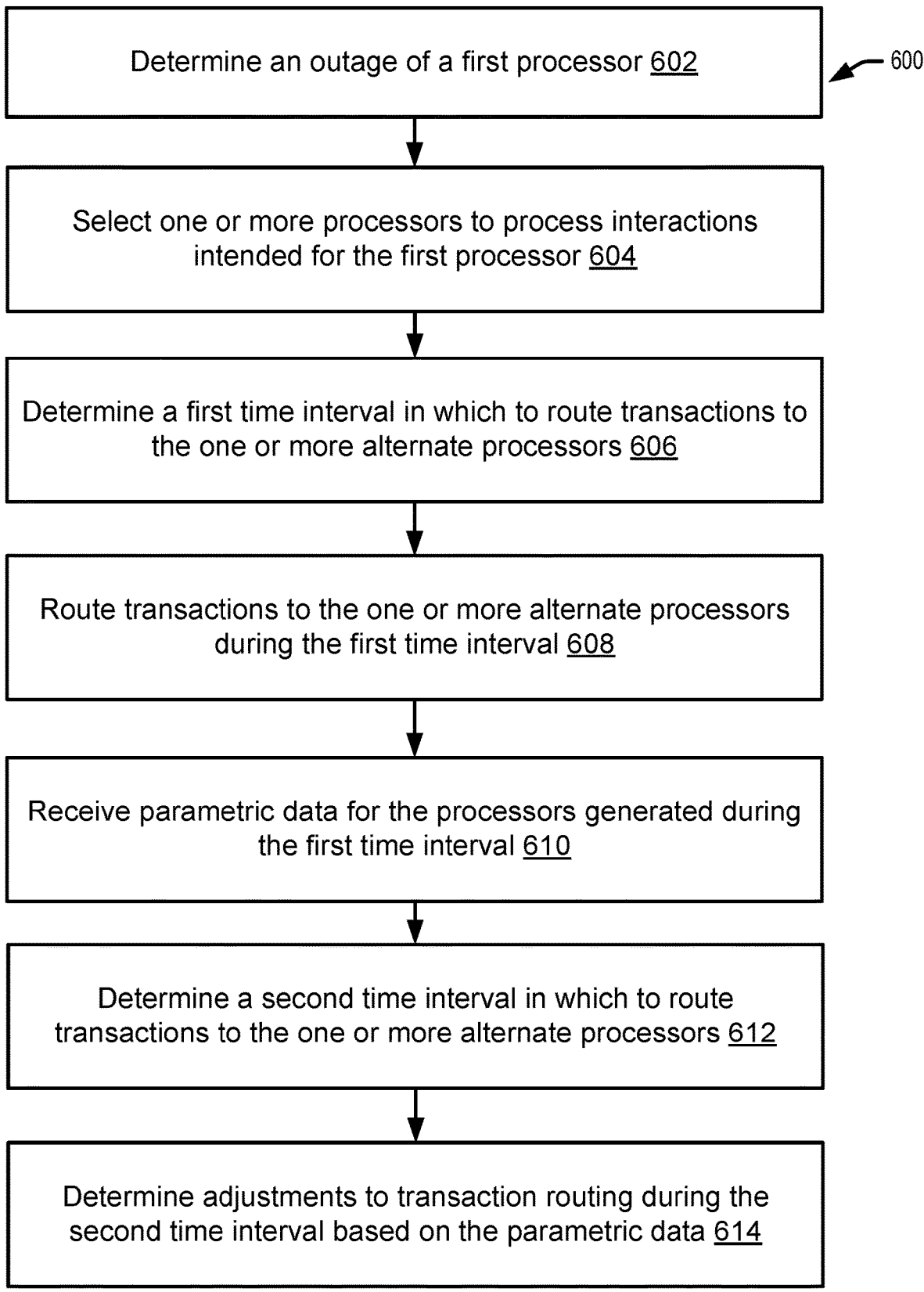
FIG. 6 shows an example of a flow for distributing transactions to processors, according to embodiments of the present disclosure.

FIG. 6 shows an example of a flow 600 for distributing transactions to processors, according to embodiments of the present disclosure. In an example, the flow 600 includes operation 602, involving determining an outage of a first processor. The outage may be determined based on parametric data received for the first processor. For example, the parametric data may indicate that transactions transmitted to the first processor are being declined or failed, rather than processed.

In an example, the flow 600 includes operation 604, involving selecting one or more alternate processors to process transactions intended for the first processor. The one or more alternate processors may be configured to process the same transactions that the first processor can process. If a configuration for the first processor indicates a desired alternate processor, that alternate processor may be selected. But, the alternate processor may not have enough unused processing capacity to process all expected transactions for the first processor. Or, the alternate processor may have enough processing capacity, but processing additional transactions may result in high processing latency. So, additional alternate processors may be selected as well.

In some examples, expected transactions may be evenly distributed between the multiple alternate processors. Alternatively, the expected transactions may be distributed between the multiple alternate processors based on attributes such as current workload of each alternate processor, available processing capacity of each alternate processor, processing latency of each alternate processor, etc. Such attributes can be determined based on parametric data for the alternate processors. For example, parametric data for a first alternate processor may indicate an unused processing capacity of 30% and parametric data for a second alternate processor may indicate an unused processing capacity of 10%. If an expected amount of transactions for the first processor require a processing capacity of 15%, the first alternate processor can be selected to receive an amount of transactions that result in an increase in processing capacity of 10%. And, the second alternate processor can be selected to receive an amount of transactions that result in an increase in processing capacity of 5%.

In an example, the flow 600 includes operation 606, involving determining a first time interval in which to route transactions to the one or more alternate processors. The first time interval can determined because transactions intended for the first processor may be routed to the alternate processors in phases, rather than all at once. The first time interval can be a first phase in which some traffic is directed away from the first processor and toward the alternate processors. A length of the first time interval can depend on parametric data for the first processor and alternate processors. For example, if the health of the first processor is changing relatively quickly, the first time interval may be relatively shorter to ensure near real-time routing of transactions in response to the changes. And, if the alternate processors have relatively high latency or unused processing capacity, the first time interval may be relatively shorter. Monitoring the health of the alternate processors in shorter time intervals can allow the system to prevent or mitigate outages of the alternate processors as well. If the parametric data indicates that the health of the first processor or alternate processers is remaining relatively stable, the first time interval may be relatively longer.

In an example, the flow 600 includes operation 608, involving routing transactions to the one or more alternate processors during the first time interval. For example, a set of transactions can be received during the first time interval. A first subset of the set of transactions can be routed to the first alternate processor. A second, smaller subset of the set of transactions can be routed to the second alternate processor, which may have a lower unused processing capacity than the first alternate processor. The first subset and second subset together may only be a portion of the set of transactions received during the first time interval, as transactions may be re-routed in phases. A remainder of the set of transactions can be queued for the next time interval. Examples of processing each transaction of the set are further described in the next figures.

In an example, the flow 600 includes operation 610, involving receiving parametric data for the processors generated during the first time interval. For example, the parametric data can indicate that the outage is persisting for the first processor. The parametric data can also indicate that the second alternate processor is experiencing a significant increase in processing latency. In an example, the flow 600 includes operation 612, involving determining a second time interval in which to route transactions to the one or more alternate processors. If parametric data indicates that conditions in the system remain relatively stable, the second time interval may be the same or longer than the first time interval.

In an example, the flow 600 includes operation 614, involving determining adjustments to transaction routing during the second time interval based on the parametric data. If the parametric data indicates that conditions remain stable, the amount of transactions routed to the alternate processors can continue to increase as part of the second phase. In an example, because the parametric data indicates that processing latency for the second alternate processor has increased, the amount of transactions routed to the second processor can be reduced rather than increased. This may reduce processing latency for the second alternate processor. The transactions that would have been routed to the second alternate processor can instead be routed to the first alternate processor if parametric data indicates that the first processor is capable. If not, the transactions intended for the second alternate processor can be routed to a third alternate processor, or queued until the next time interval.

Figure 7:
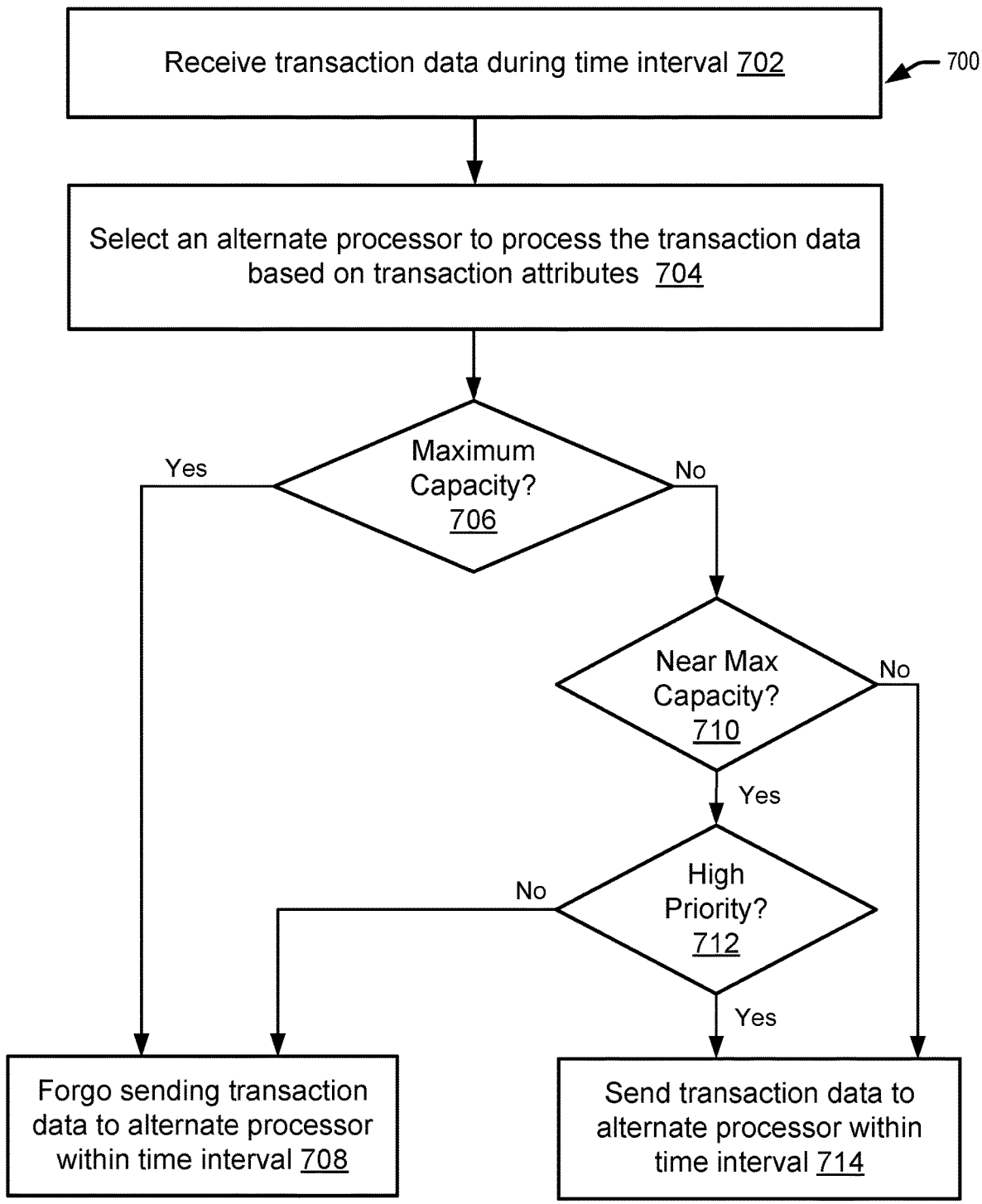
FIG. 7 shows another example of a flow for distributing transactions to processors, according to embodiments of the present disclosure.

FIG. 7 shows another example of a flow 700 for distributing transactions to processors, according to embodiments of the present disclosure. In an example, the flow 700 includes operation 702, involving receiving transaction data during a time interval. The transaction can be received from a service provider and initiated by a user as a request to perform a transaction. The time interval may be a period of time in which a first processor, which may typically process transaction data received from the service provider, is experiencing an outage. Transaction data may therefore be routed elsewhere during the time interval. The transaction data may include transaction attributes that are predefined by the service provider or the user. Examples of the transaction attributes can include a location of the user initiating the interaction, a value of the interaction, a transaction method for the interaction, etc.

In an example, the flow 700 includes operation 704, involving selecting an alternate processor to process the transaction data based on transaction attributes. The alternate processor may be selected based on the alternate processor being configured to process transaction data with such transaction attributes. If multiple processors can process the transaction data, the alternate processor can be selected based on parametric data such as current workload or processing capacity. For example, other processors may have a higher workload, so the alternate processor may be selected to keep latency of the system low.

In an example, the flow 700 includes operation 706, involving determining whether the alternate processor has reached a maximum processing capacity. The maximum processing capacity can be predefined by the service provider. The processing capacity for the alternate processor can be determined from parametric data that can be continuously monitored for the alternate processor. If the alternate processor has reached the maximum processing capacity, the flow 700 can continue to operation 708. If the alternate processor has not reached the maximum processing capacity, the flow 700 can continue to operation 710.

In an example, the flow 700 includes operation 708, involving forgoing sending the transaction data to the alternate processor within the time interval. The transaction data may therefore be queued to be processed by the first processor after the outage no longer persists, timed out, declined, failed, or queued to be processed by the alternate processor during a subsequent time interval.

In an example, the flow 700 includes operation 710, involving determining whether the alternate processor is near maximum processing capacity. For example, this can involve determining that parametric data for the alternate processor indicates that processing capacity of the alternate processor has exceeded a predefined threshold that is slightly lower than the maximum processing capacity. Exceeding the predefined threshold may indicate that routing additional transaction data to the alternate processor may trigger an outage or other such trigger events. If the alternate processor is near maximum processing capacity, the flow 700 can continue to operation 712. If the alternate processor is not near maximum processing capacity, the flow 700 can continue to operation 714.

In an example, the flow 700 includes operation 712, involving determining whether the transaction data has a high priority. The priority can be determined based on the criteria in the set of mitigation criteria that were met by the transaction data. For example, the transaction data may meet multiple criteria from the set of mitigation criteria, including having a time priority and a transaction type priority due to the associated transaction having a relatively high value. Meeting multiple criteria, or a criteria designated as having a higher priority, may indicate that the transaction data has a high priority. Because the alternate processor may be nearing maximum processing capacity, only transaction data with high priority may be routed to the alternate processor. If the transaction data does not have high priority, the flow 700 can continue to operation 708. If the transaction data does have high priority, the flow 700 can continue to operation 714.

In an example, the flow 700 includes operation 714, involving sending transaction data to the alternate processor within the time interval. The alternate processor may process the transaction data to complete the transaction. The alternate processor may transmit response data to the service provider indicating that the transaction has been completed. In this way, the transaction data may be processed in real time, and without discernable time difference to the service provider despite the fact that the first processor is experiencing an outage.

Although FIG. 7 is described as determining whether to send transaction data to the alternate processor due to being at or near maximum processing capacity, in other examples other parametric data may be used to determine routing of transaction data. For example, transaction data may not be sent to the alternate processor if its parametric data indicates that the alternate processor is at or near a processing latency threshold, a transaction decline rate threshold, a transaction rate success threshold, or any other data that indicates that the alternate processor may experience an outage or diminished functioning in the near future.

Figure 8:
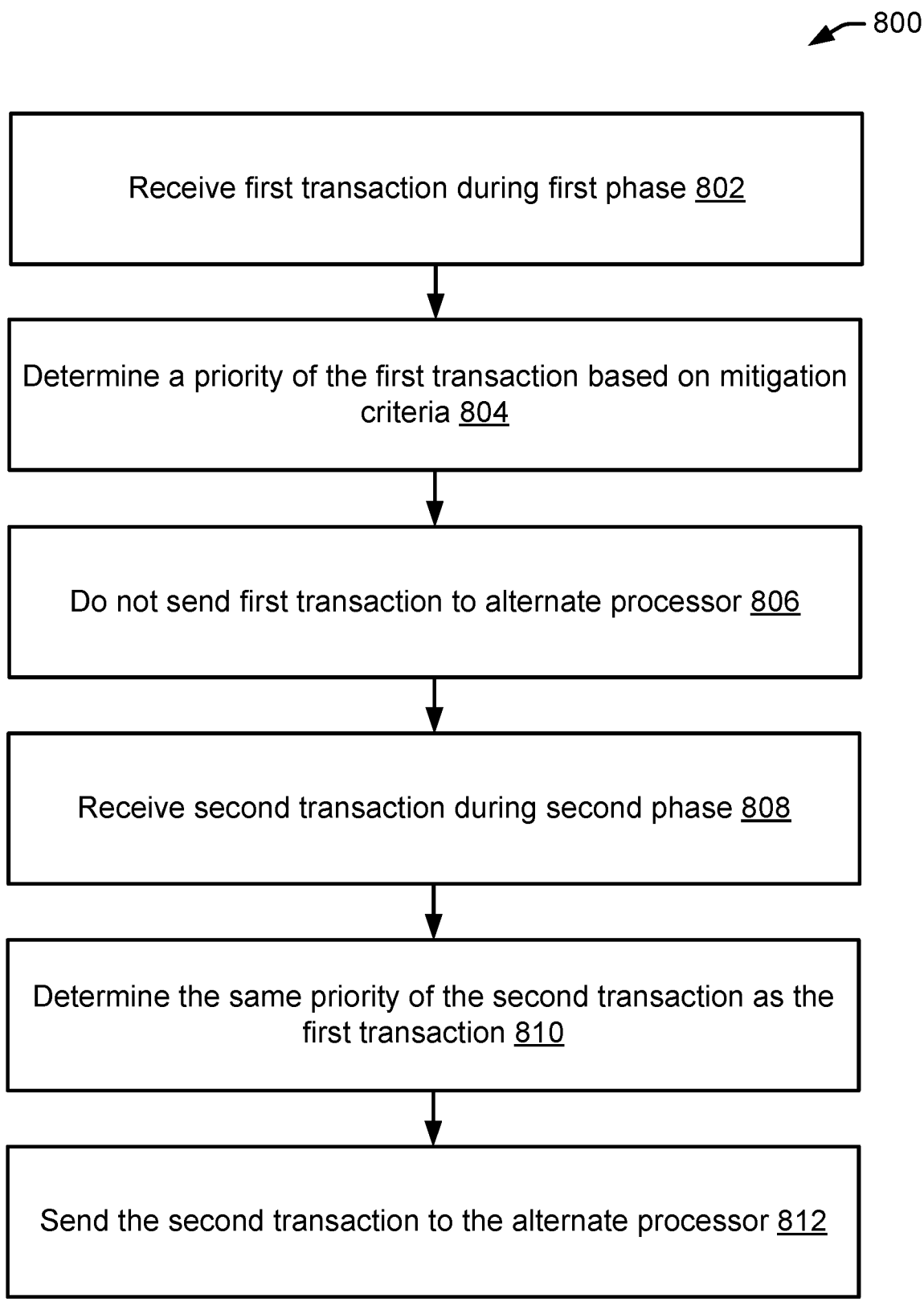
FIG. 8 shows another example of a flow for distributing transactions to processors, according to embodiments of the present disclosure.

FIG. 8 shows another example of a flow 800 for distributing transactions to processors, according to embodiments of the present disclosure. In an example, the flow 800 includes operation 802, involving receiving a first transaction during a first phase. The first phase may be a first period of time in which a first processor that typically processes transactions is experiencing an outage. In this example, the first phase may last for five minutes. During the first phase, some or all transactions may be routed away from the first processor and to an alternate processor. The percentage of transaction traffic routed to the alternate processor may be determined using parametric data for the first processor and/or the alternate processor. For example, the parametric data may indicate an unused processing capacity of the alternate processor. This unused processing capacity can be used to determine that the alternate processor can handle 60% of the transactions intended for the first processor. Additionally, the length of the phase can be determined using the parametric data. If the statuses of the first processor or alternate processor are changing rapidly, phases may be relatively longer. If the statuses are remaining relatively stable, the phases may be relatively shorter. When the first transaction is received, the alternate processor may be at or near its maximum processing capacity.

In an example, the flow 800 includes operation 804, involving determining a priority of the first transaction by determining if the first transaction meets a set of mitigation criteria. The first transaction may meet some of the mitigation criteria, such as being associated with a particular account. The first transaction may have a priority based on that mitigation criteria being met. But, because the alternate processor is at or near its maximum processing capacity, the priority of the first transaction may not be high enough to be sent to the alternate processor for processing. In an example, the flow 800 includes operation 806, involving not sending the first transaction to the alternate processor. Instead, the first transaction can be queued to be processed by the first processor when the outage is over. Or the first transaction can be timed out, declined or failed. In another example, the first transaction can be queued to be processed by the alternate processor during a subsequent phase.

In an example, the flow 800 includes operation 808, involving receiving a second transaction during a second phase. The second phase may occur after the first phase has ended. The outage of the first processor may persist during the second phase. In some examples, the number of transactions sent to the alternate processor may be different in the second phase compared to the first phase. For example, 80% of transactions intended for the first processor may be routed to the second processor during the second phase.

In an example, the flow 800 includes operation 810, involving determining the same priority of the second transaction as the first transaction. For example, the second transaction may have the same transaction attributes as the first transaction. The second transaction may also be associated with a particular account specified in the set of mitigation criteria. In an example, the flow 800 includes operation 812, involving sending the second transaction to the alternate processor. Even though the second transaction has the same priority as the first transaction, and the first transaction was not sent to the alternate processor, the second processor may be sent to the alternate processor. This is because of the differing circumstances in the second phase. For example, because the alternate processor may be able to handle more transactions in the second phase than the first phase (e.g., 80% of traffic instead of 60% of traffic), the second transaction can be processed by the alternate processor. In some examples, the set of mitigation criteria may change depending on the phase. For example, the lower percentage of traffic routed to the alternate processor, the stricter the mitigation criteria may become in order to enable processing of the highest transactions only. In some examples, the first transaction (which was queued) may also be processed by the alternate processor in the second phase.

Figure 9:
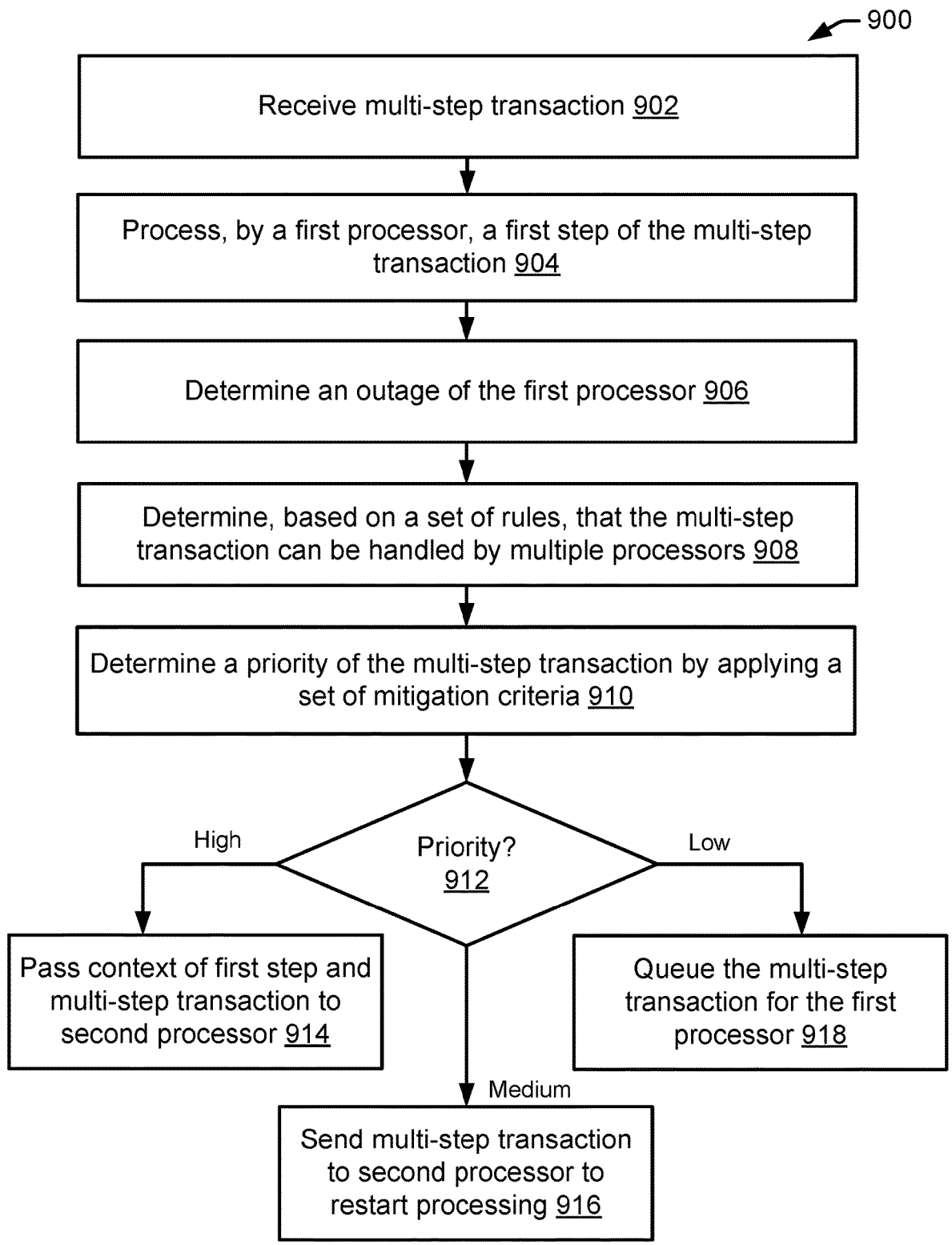
FIG. 9 shows another example of a flow for distributing transactions to processors, according to embodiments of the present disclosure.

FIG. 9 shows another example of a flow 900 for distributing transactions to processors, according to embodiments of the present disclosure. In an example, the flow 900 includes operation 902, involving receiving a multi-step transaction from a service provider. Processing the multi-step transaction may involve multiple processing steps. In an example, the flow 900 includes operation 904, involving processing, by a first processor, a first step of the multi-step transaction. In an example, the flow 900 includes operation 906, involving determining an outage of the first processor. This outage may occur after the first processor processes the first step, but before the first processor can process the one or more remaining steps for the multi-step transaction. Thus, the one or more remaining steps may still need to be processed.

In an example, the flow 900 includes operation 908, involving determining, based on a set of rules, that the multi-step transaction can be handled by multiple processors. The set of rules can dictate the types of multi-step transactions that can and cannot be handled by the multiple processors. For example, a multi-step transaction may involve a first authentication step. Because the multi-step transaction must be securely processed by first being authenticated, the set of rules may dictate that the multi-step transaction cannot be handled by multiple processors. Only the first processor that authenticated the multi-step transaction can complete processing of the multi-step transaction. So, if the multi-step transaction cannot be handled by multiple processors, the multi-step transaction can be queued until the first processor is no longer experiencing an outage. As depicted in FIG. 9, if the multi-step transaction can be handled by multiple processors, the flow 900 can continue to operation 910.

In an example, the flow 900 includes operation 910, involving determining a priority of the multi-step transaction by applying a set of mitigation criteria. The set of mitigation criteria may be applied because the first processor may be unable to process the one or more remaining steps. If the multi-step transaction meets none or a few of the mitigation criteria, the multi-step transaction may have a relatively low priority. If the multi-step transaction meets some of the mitigation criteria, or mitigation criteria that have lower priority, the multi-step transaction may have a relatively medium priority. If the multi-step transaction meets many or all of the mitigation criteria, or mitigation criteria designated as important, the multi-step transaction may have relatively high priority. The priority may be determined using rules governing priorities of various mitigation criteria. If the multi-step transaction has a relatively high priority, the flow

900 can continue to operation 914. If the multi-step transaction has a relatively medium priority, the flow 900 can continue to operation 916. If the multi-step transaction has a relatively low priority, the flow 900 can continue to operation 918.

In an example, the flow 900 includes operation 914, involving passing context for the first step of the multi-step transaction, and passing the multi-step transaction, to a second processor. The second processor may process some or all transactions intended for the first processor. The context for the first step can involve any data used or produced during processing of the first step. The second processor can use the context to process the additional steps in the multi-step transaction without having to restart processing of the multi-step transaction. This can maintain real-time processing of the multi-step transaction, even with the outage of the first processor. This can be due to the high priority of the multi-step transaction.

In an example, the flow 900 includes operation 916, involving sending the multi-step transaction to the second processor to restart processing. Context for the first step may not be stored or passed to the second processor. So, the second processor may process the first step of the multi-step transaction again, as well as the additional steps in the multi-step transaction. Because the multi-step transaction has a medium priority, the multi-step transaction may still be processed relatively quickly.

In an example, the flow 900 includes operation 918, involving queueing the multi-step transaction for the first processor. Context for the first step may not be stored or passed to the second processor. Instead, the multi-step transaction may be queued until the first processor is no longer experiencing the outage. When the first processor is no longer experiencing the outage, the first processor may restart processing of the multi-step transaction. This can include processing the first step again. Although the multi-step transaction may not be processed relatively quickly, this can allow higher priority transactions to be processed by the alternate processor in the meantime.

Figure 10:
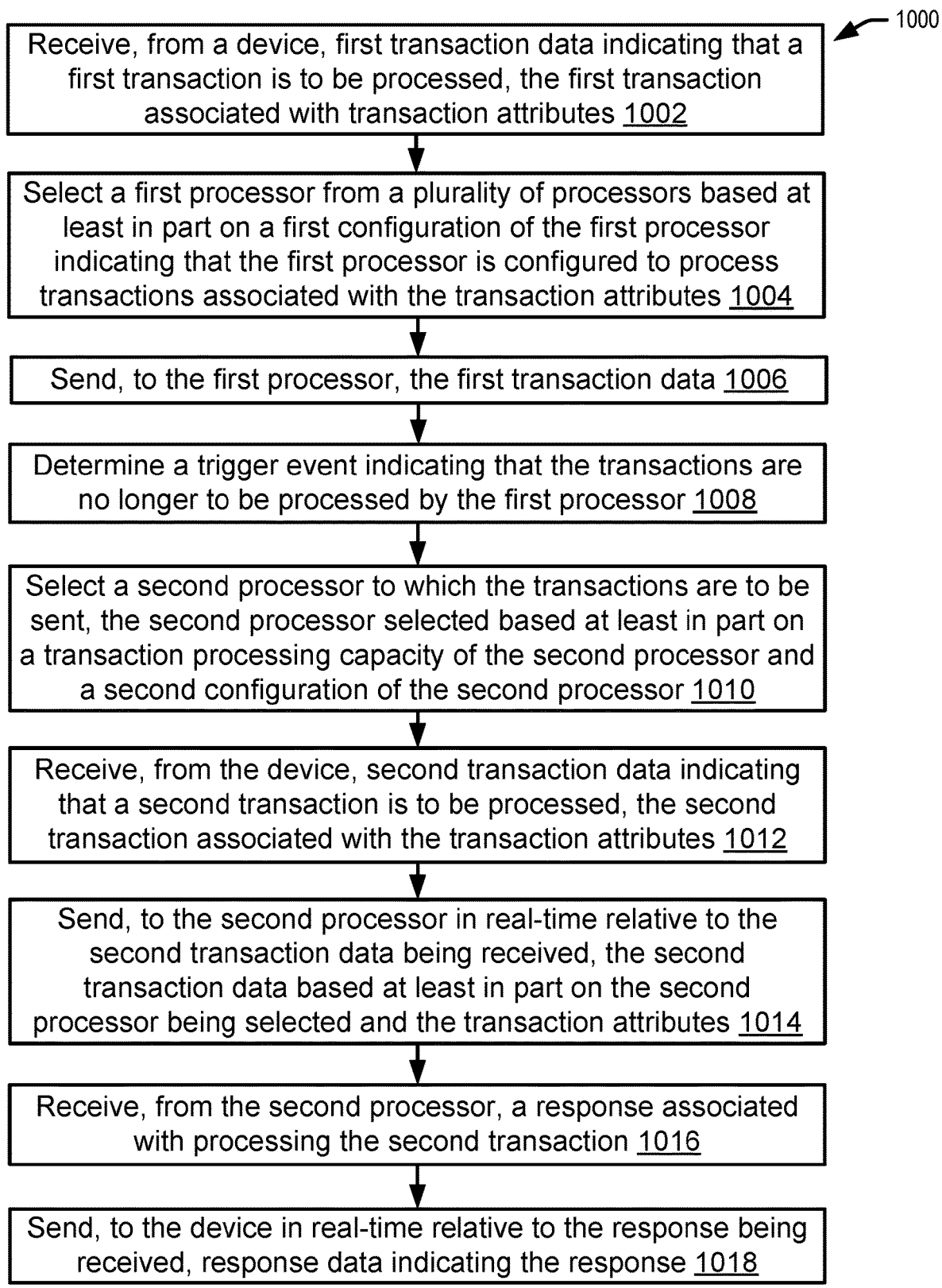
FIG. 10 shows another example of a flow for distributing transactions to processors, according to embodiments of the present disclosure.

FIG. 10 shows another example of a flow 1000 for distributing transactions to processors, according to embodiments of the present disclosure. In an example, the flow 1000 includes operation 1002, involving receiving, from a device, first transaction data indicating that a first transaction is to be processed. The first transaction can be associated with transaction attributes.

In an example, the flow 1000 includes operation 1004, involving selecting a first processor from a plurality of processors based at least in part on a first configuration of the first processor indicating that the first processor is configured to process transactions associated with the transaction attributes. In an example, the flow 1000 includes operation 1006, involving sending, to the first processor, the first transaction data.

In an example, the flow 1000 includes operation 1008, involving determining a trigger event indicating that the transactions are no longer to be processed by the first processor. The flow 1000 can further involve determining that the trigger event indicates an outage associated with the first processor. Determining the trigger event can include determining persistence during a time interval of at least one of an outage, a processing latency, or a used transaction processing capacity associated with the first processor. The trigger event may be generated based on the persistence. For example, the flow 1000 can involve determining that the outage persists during the time interval. In some examples, the trigger event can be determined based on receiving parametric data indicating at least one of an outage, a used transaction processing capacity, an unused transaction processing capacity, or a processing latency associated with the first processor. This can include receiving, from the first processor, first parametric data associated with first transaction processing by the first processor and receiving, from the second processor, second parametric data associated with first transaction processing by the second processor.

In an example, the flow 1000 includes operation 1010, involving selecting, from the plurality of processors, a second processor to which the transactions are to be sent, the second processor selected based at least in part on a transaction processing capacity of the second processor and a second configuration of the second processor. The second processor may also be selected based at least in part on persistence of the outage during the time interval. Additionally, the flow 1000 can involve receiving, from the second processor, parametric data indicating at least one of a used transaction processing capacity, an unused transaction processing capacity, or a processing latency associated with the second processor. The second processor can be selected based at least in part on the parametric data, including the first parametric data for the first processor and the second parametric data for the second processor.

Further, the second processor can be selected using a machine learning model. For example, the flow 1000 can involve generating an input to a machine learning model based at least in part on the parametric data. And, the flow 1000 can involve determining an output of the machine learning model based at least in part on the input. The output can indicate that the second processor is to be selected.

In an example, the flow 1000 includes operation 1012, involving receiving, from the device, second transaction data indicating that a second transaction is to be processed, the second transaction associated with the transaction attributes. In some examples, the flow 1000 can involve determining, based at least in part on a set of parameters associated with distributing a workload to the second processor, that a subset of transactions is to be sent during the time interval to the second processor instead of the first processor. The second transaction data can be received during the time interval.

For example, the flow 1000 can involve determining that a first subset of transactions associated with the transaction attributes is to be sent to the second processor instead of the first processor during a first time interval. At least a size of the first subset or a duration of the first time interval can be based at least in part on a set of parameters, and the set of parameters can be predefined or include the first parametric data and the second parametric data. The flow 1000 can involve receiving, during the first time interval, additional parametric data associated with at least one of the first processor or the second processor. Based at least in part on the additional parametric data, the flow 1000 can involve determining that a second subset of transactions associated with the transaction attributes is to be sent to the first processor or the second processor during a second time interval subsequent to the first time interval.

In an example, the flow 1000 includes operation 1014, involving sending, to the second processor in real-time relative to the second transaction data being received, the second transaction data based at least in part on the second processor being selected and the transaction attributes. In some examples, the system can determine, based at least in part on the transaction processing capacity of the second processor, that a set of mitigation criteria is to be applied in association with sending the transactions to the second processor. And, the system can determine that the second transaction meets the set of mitigation criteria. The second transaction can be sent to the second processor based at least in part on the second transaction meeting the set of mitigation criteria. The set of mitigation criteria can indicate at least one of a time priority, a security priority, a transaction type priority, or an account priority associated with an amount used by a device to send the transaction data.

In some examples, the flow 1000 can involve determining that an amount of expected transactions to be sent to the second processor instead of the first processor exceeds the transaction processing capacity of the second processor. Thus, the flow 1000 can involve determining that the set of mitigation criteria is to be applied to select a subset of transactions to send to the second processor instead of the first processor. The amount of expected transactions is determined for the time interval, and the set of mitigation criteria is determined to be applied during the time interval. In some examples, the flow 1000 can involve determining that the second transaction meets the set of mitigation criteria. The second transaction is therefore received and sent to the second processor during the time interval based at least in part on the second transaction meeting the set of mitigation criteria. In other examples, the flow 1000 can involve determining that the set of mitigation criteria is unmet for another transaction associated with the transaction attributes. And, other transaction data may be received during the time interval. So, the flow 1000 can involve forgoing sending the other transaction to the second processor. The other transaction can be queued to be processed by the first processor, timed out, declined, or failed.

In some examples, the flow 1000 can involve determining that the set of mitigation criteria is met for another transaction associated with the transaction attributes and having other transaction data received during the time interval. Then, the flow 1000 can involve forgoing sending the other transaction to the second processor during the time interval. The other transaction can then be queued to be processed by the first processor, timed out, declined, failed or queued to be processed by the second processor during a subsequent time interval.

The flow 1000 may also involve receiving other transaction data indicating another transaction that includes a plurality of steps, and determining that a first step of the other transaction was processed by the first processor prior to the trigger event. Then, it can be determined that a second step of the transaction remains to be processed after the trigger event. Thus, at least one of the following can be performed. First, the other transaction can be queued to be further processed by the first processor. Second, the other transaction can be sent to the second processor such that the second processor restarts processing the other transaction. Or, third, processing data associated with the first step to the second processor can be sent such that the second processor processes the second step based at least in part on the processing data. In an example, the flow 1000 includes operation 1016, involving receiving, from the second processor, a response associated with processing the second transaction. In an example, the flow 1000 includes operation 1018, involving sending, to the device in real-time relative to the response being received, response data indicating the response.

Figure 11:
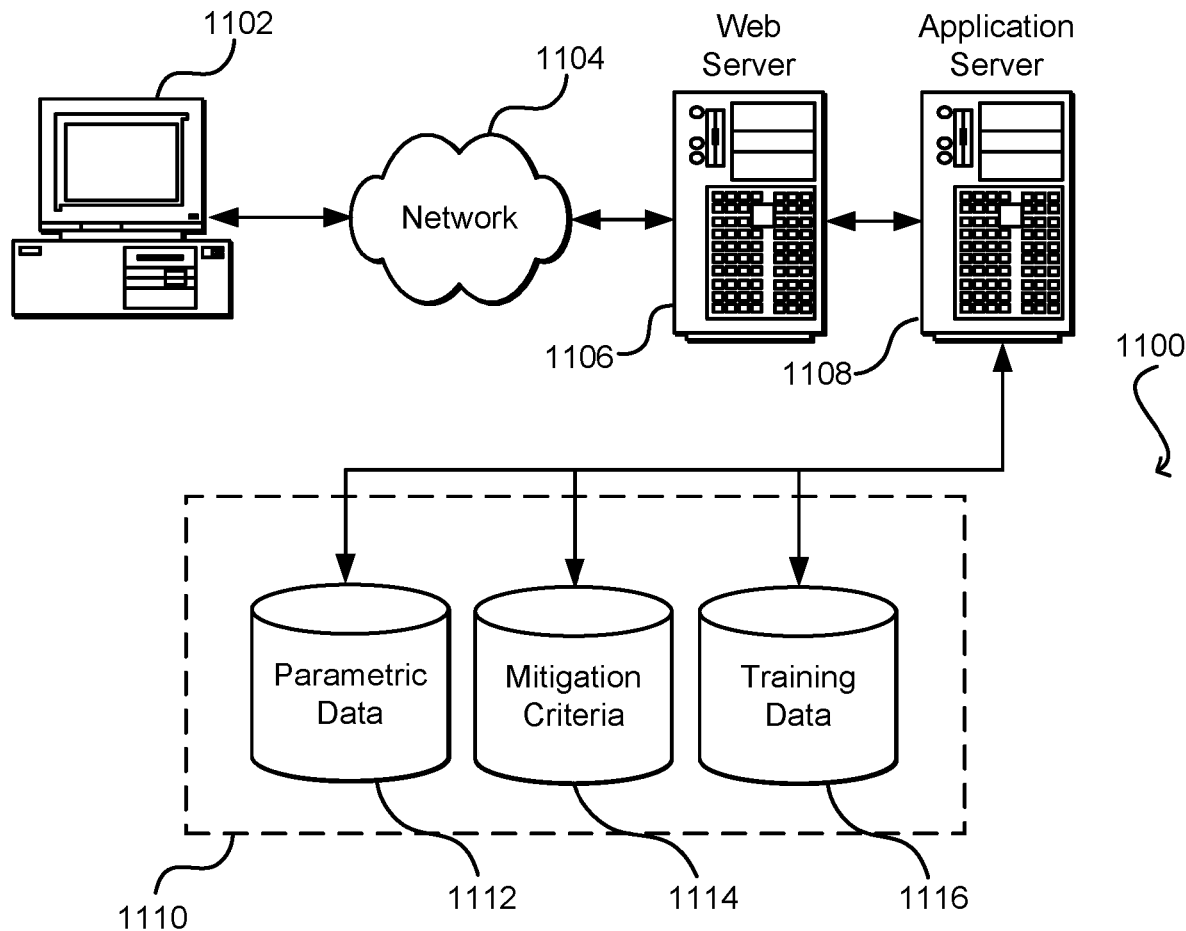
FIG. 11 illustrates an example environment for implementing aspects in accordance with various embodiments.

FIG. 11 illustrates an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device (including the devices described herein above) operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing information which can be used by modules described herein, such as parametric data 1112, mitigation criteria 1114, and training data 1116. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memory storing instructions that, upon execution by the one or more processors, configure the system to:
      determine a trigger event indicating that transactions associated with transaction attributes are no longer to be processed by a first processor of a plurality of processors;
      select, from the plurality of processors, a second processor to which the transactions are to be sent, the second processor selected based at least in part on a transaction processing capacity of the second processor and a second configuration of the second processor indicating that the second processor is configured to process the transactions;
      determine that a subset of transactions associated with the transaction attributes is to be sent to the second processor instead of the first processor during a first time interval, wherein at least a size of the subset or a duration of the first time interval is based at least in part on first parametric data and second parametric data, the first parametric data associated with first transaction processing by the first processor, and the second parametric data associated with second transaction processing by the second processor;
      receive, during the first time interval and from a device, transaction data indicating that a transaction is to be processed, the transaction associated with the transaction attributes; and
      send, to the second processor in real-time relative to the transaction data being received, the transaction data based at least in part on the second processor being selected and the transaction attributes.

2. The system of claim 1, wherein the one or more memory store further instructions that, upon execution by the one or more processors, configure the system to:
   determine, based at least in part on the transaction processing capacity of the second processor, that a set of mitigation criteria is to be applied in association with sending the transactions to the second processor; and
   determine that the transaction meets the set of mitigation criteria, wherein the transaction data is sent to the second processor based at least in part on the transaction meeting the set of mitigation criteria.

3. The system of claim 1, wherein the one or more memory store further instructions that, upon execution by the one or more processors, configure the system to: determine, based at least in part on the second parametric data, a set of parameters associated with distributing a workload to the second processor, wherein the transaction data is sent to the second processor based at least in part on the set of parameters.

4. The system of claim 3, wherein the one or more memory store additional instructions that, upon execution by the one or more processors, configure the system to:
   determine that the trigger event indicates an outage associated with the first processor; and
   determine that the outage persists during the first time interval, wherein the transaction data is sent to the second processor further based at least in part on persistence of the outage during the first time interval.

5. A computer-implemented method comprising:
   determining a trigger event indicating that transactions associated with transaction attributes are no longer to be processed by a first processor;
   selecting a second processor to which the transactions are to be sent, the second processor selected based at least in part on a transaction processing capacity of the second processor and a configuration of the second processor indicating that the second processor is configured to process the transactions;

determining that a subset of transactions associated with the transaction attributes is to be sent to the second processor instead of the first processor during a first time interval, wherein at least a size of the subset or a duration of the first time interval is based at least in part on first parametric data and second parametric data, the first parametric data associated with first transaction processing by the first processor, and the second parametric data associated with second transaction processing by the second processor;

receiving, during the first time interval, transaction data indicating that a transaction is to be processed, the transaction associated with the transaction attributes; and sending, to the second processor in real-time relative to the transaction data being received, the transaction data based at least in part on the second processor being selected and the transaction attributes.

6. The computer-implemented method of claim 5, further comprising:

determining persistence during a time interval of at least one of an outage, a processing latency, or a used transaction processing capacity associated with the first processor, wherein the trigger event is generated based on the persistence.

7. The computer-implemented method of claim 5, further comprising:

receiving, from the second processor, the second parametric data indicating at least one of a used transaction processing capacity, an unused transaction processing capacity, or a processing latency associated with the second processor.

8. The computer-implemented method of claim 7, further comprising:

generating an input to a machine learning model based at least in part on the second parametric data; and determining an output of the machine learning model based at least in part on the input, the output indicating that the second processor is to be selected.

9. The computer-implemented method of claim 5, further comprising:

receiving, from the first processor, the first parametric data indicating at least one of an outage, a used transaction processing capacity, an unused transaction processing capacity, or a processing latency associated with the first processor.

10. The computer-implemented method of claim 5, further comprising:

receiving, from the first processor, the first parametric data; and receiving, from the second processor, the second parametric data.

11. The computer-implemented method of claim 5, further comprising:

receiving, during the first time interval, additional parametric data associated with at least one of the first processor or the second processor; and determining, based at least in part on the additional parametric data, that a second subset of transactions associated with the transaction attributes is to be sent to the first processor or the second processor during a second time interval subsequent to the first time interval.

12. The computer-implemented method of claim 5, further comprising:

determining that an amount of expected transactions to be sent to the second processor instead of the first processor exceeds the transaction processing capacity of the second processor; and determining that a set of mitigation criteria is to be applied to select the subset of transactions to send to the second processor instead of the first processor.

13. One or more non-transitory computer-readable storage media storing instructions that, upon execution on a system, cause the system to perform operations comprising:

determining a trigger event indicating that transactions associated with transaction attributes are no longer to be processed by a first processor;

selecting a second processor to which the transactions are to be sent, the second processor selected based at least in part on a transaction processing capacity of the second processor and a configuration of the second processor indicating that the second processor is configured to process the transactions;

determining that a subset of transactions associated with the transaction attributes is to be sent to the second processor instead of the first processor during a first time interval, wherein at least a size of the subset or a duration of the first time interval is based at least in part on first parametric data and second parametric data, the first parametric data associated with first transaction processing by the first processor, and the second parametric data associated with second transaction processing by the second processor;

receiving, during the first time interval, transaction data indicating that a transaction is to be processed, the transaction associated with the transaction attributes; and sending, to the second processor in real-time relative to the transaction data being received, the transaction data based at least in part on the second processor being selected and the transaction attributes.

14. The one or more non-transitory computer-readable storage media of claim 13 storing further instructions that, upon execution on the system, cause the system to perform additional operations comprising:

determining that an amount of expected transactions to be sent to the second processor instead of the first processor exceeds the transaction processing capacity of the second processor; and determining that a set of mitigation criteria is to be applied to select the subset of transactions to send to the second processor instead of the first processor.

15. The one or more non-transitory computer-readable storage media of claim 14, wherein the amount of expected transactions is determined for a time interval, wherein the set of mitigation criteria is determined to be applied during the time interval.

16. The one or more non-transitory computer-readable storage media of claim 15 storing additional instructions that, upon execution on the system, cause the system to perform further operations comprising:

determining that the transaction meets the set of mitigation criteria, wherein the transaction is received and sent to the second processor during the time interval based at least in part on the transaction meeting the set of mitigation criteria.

17. The one or more non-transitory computer-readable storage media of claim 15 storing additional instructions that, upon execution on the system, cause the system to perform further operations comprising:
- determining that the set of mitigation criteria is unmet for another transaction associated with the transaction attributes and having other transaction data received during the time interval; and
- forgoing sending the other transaction to the second processor, wherein the other transaction is queued to be processed by the first processor, timed out, declined, or failed.

18. The one or more non-transitory computer-readable storage media of claim 15 storing additional instructions that, upon execution on the system, cause the system to perform further operations comprising:
- determining that the set of mitigation criteria is met for another transaction associated with the transaction attributes and having other transaction data received during the time interval; and
- forgoing sending the other transaction to the second processor during the time interval, wherein the other transaction is queued to be processed by the first processor, timed out, declined, failed, or is queued to be processed by the second processor during a subsequent time interval.

19. The one or more non-transitory computer-readable storage media of claim 13 storing further instructions that, upon execution on the system, cause the system to perform additional operations comprising:
- selecting a third processor based at least in part on a transaction processing capacity of the third processor and a configuration of the third processor indicating that the third processor is configured to process the transactions;
- receiving additional transaction data indicating that an additional transaction is to be processed, the additional transaction associated with the transaction attributes; and
- sending, to the third processor, the additional transaction based at least in part on traffic distribution, the traffic distribution being at least one of an even distribution between selected processors or dependent on the transaction processing capacity of the third processor.

20. The one or more non-transitory computer-readable storage media of claim 13, storing further instructions that, upon execution on the system, cause the system to perform additional operations comprising:
- receiving other transaction data indicating another transaction that includes a plurality of steps;
- determining that a first step of the other transaction was processed by the first processor prior to the trigger event;
- determining that a second step of the transaction remains to be processed after the trigger event; and
- performing at least one of:
    - queuing the other transaction to be further processed by the first processor;
    - sending the other transaction to the second processor such that the second processor restarts processing the other transaction; or
    - sending processing data associated with the first step to the second processor such that the second processor processes the second step based at least in part on the processing data.

\* \* \* \* \*